United States Patent
Kuykendall

(10) Patent No.: US 12,233,708 B2
(45) Date of Patent: Feb. 25, 2025

(54) FUEL TANK WITH INTERNAL BLADDER AND METHOD

(71) Applicant: John Kuykendall, Fountain Inn, SC (US)

(72) Inventor: John Kuykendall, Fountain Inn, SC (US)

( * ) Notice: Subject to any disclaimer, the term of this patent is extended or adjusted under 35 U.S.C. 154(b) by 962 days.

(21) Appl. No.: 17/301,010

(22) Filed: Mar. 22, 2021

(65) Prior Publication Data
US 2021/0300176 A1    Sep. 30, 2021

Related U.S. Application Data

(60) Provisional application No. 63/000,752, filed on Mar. 27, 2020.

(51) Int. Cl.
*B60K 15/03* (2006.01)
*B65D 90/04* (2006.01)

(52) U.S. Cl.
CPC ...... *B60K 15/03177* (2013.01); *B65D 90/047* (2013.01); *B60K 2015/03046* (2013.01); *B60K 2015/03184* (2013.01); *B60K 2015/03447* (2013.01); *B65D 2590/046* (2013.01)

(58) Field of Classification Search
CPC .... B60K 15/03177; B60K 2015/03046; B60K 2015/03184; B60K 2015/03447; B65D 90/047; B65D 2590/046
See application file for complete search history.

(56) References Cited

U.S. PATENT DOCUMENTS

| | | | |
|---|---|---|---|
| 4,254,887 A | 3/1981 | Bold | |
| 4,524,609 A | 6/1985 | Sharp | |
| 4,607,522 A | 8/1986 | Sharp | |
| 4,648,523 A | 3/1987 | Strock | |
| 4,696,186 A | 9/1987 | Sharp | |
| 4,763,805 A * | 8/1988 | Strock | B65D 90/501 220/723 |
| 4,784,287 A * | 11/1988 | Yamada | B65D 90/047 383/41 |
| 4,796,676 A | 1/1989 | Hendershot et al. | |
| 4,925,057 A * | 5/1990 | Childress | B60K 15/077 169/45 |
| 5,072,623 A | 12/1991 | Hendershot | |
| 5,158,201 A | 10/1992 | Bartlow | |

(Continued)

*Primary Examiner* — Shawn M Braden
(74) *Attorney, Agent, or Firm* — Southeast IP Group LLC; Thomas L. Moses

(57) ABSTRACT

A fuel tank for a generator or the like, wherein the fuel tank includes a rigid outer fuel tank structure and an inner bladder. The outer fuel tank structure includes a longitudinal channel for receiving the inner bladder. End caps are disposed on either end of the outer fuel tank structure, so that the internal bladder may be pulled therein with cables or the like. When the internal bladder needs to be replaced due to damage or corrosion, the end caps are removed and cables may be attached to one end of the damaged internal bladder for pulling it from the outer fuel tank structure. Additionally, a replacement bladder may be attached via cables to the other end of the damaged bladder, so that the replacement bladder is pulled into one end of the outer fuel tank structure while the damaged bladder is being pulled out the other end thereof.

9 Claims, 3 Drawing Sheets

(56) References Cited

U.S. PATENT DOCUMENTS

| | | | | |
|---|---|---|---|---|
| 5,183,086 A | * | 2/1993 | Fanta | B65F 9/00 |
| | | | | 141/10 |
| 8,162,164 B2 | * | 4/2012 | Podd | B65D 90/00 |
| | | | | 220/23.91 |
| 2009/0007983 A1 | | 1/2009 | Healy | |
| 2009/0308876 A1 | | 12/2009 | Christofferson et al. | |
| 2013/0213974 A1 | | 8/2013 | Weng et al. | |

\* cited by examiner

FUEL TANK WITH INTERNAL BLADDER AND METHOD

CROSS REFERENCE TO RELATED APPLICATIONS

The present application claims priority to U.S. Provisional Application No. 63/000,752 entitled Fuel Tank with Internal Bladder and Method, filed on Mar. 27, 2020. All of the foregoing applications are hereby incorporated by reference in their entireties.

BACKGROUND OF THE INVENTION

The present invention relates generally to fuel tanks having an internal bladder. More specially, the present invention relates to a fuel container and method having a removable and replacement bladder component that may be used in a variety of applications, and particularly for diesel fuel tanks used in connection with large diesel generators.

Large industrial diesel generators are commonly used today for a variety of purposes, including large scale construction projects or for high demand power environments like data centers, healthcare facilities, industrial complexes, power stations, banking, and many more critical power businesses. Some of these generators are used for primary power demands, while others are used as standby generators to provide additional power when necessary, or to maintain power to critical components during a power outage from a primary power source.

These generators may be fueled by diesel fuel, natural gas, or other types of fuel, and tend to have large fuel tanks operatively connected thereto in order to power the generators for the production of electricity. For example, fuel tanks for these generators may range from about 100 gallons to 50,000 gallons, depending on the size of the generator and its purpose.

Diesel fuel tends to be corrosive, and the fuel tanks often become degraded and need to be replaced multiple times over the average operational life of the generator itself. Replacing the fuel tanks is a major issue, which typically requires removal of the tank from the generator, thus rendering the generator inoperative and useless while those repairs are being made. It would, therefore, be advantageous to provide a fuel tank with a removable, internal bladder, so that if the bladder becomes damaged or degraded to the point of requiring a replacement, the bladder may be simply, quickly and inexpensively removed and replaced by a new bladder, which reduces (or in some cases eliminates) the down time for the generator.

There are many examples of fuel tanks that include bladders in various forms for different purposes. The documents listed below disclose fuel tanks having dual walls or internal bladders, and each of these documents described below are hereby incorporated herein by reference:

U.S. Pat. No. 4,254,887 Storage Tank

Liquid storage tank containing a collapsible bag of flexible impervious sheet material supported by a collar within the tank which floats on the stored liquid and moves with the liquid thereby dividing the interior of the shell into an air and a liquid space. The bag has an external skirt of a similar flexible sheet material attached to the supporting collar which lies between the bag and adjacent tank side walls to reduce abrasion and catching of the bag and tank walls particularly during tank emptying and filling procedures.

U.S. Pat. No. 4,524,609 Storage Tank Systems

A storage tank system especially useful for storing liquid gasoline comprises a rigid outer tank fitted with a bladder and an analyzer. The system results in a storage facility which is less likely to lose its stored liquid to the environment due to a slow leak or a sudden large leak such as is possible with an earthquake.

U.S. Pat. No. 4,607,522 Storage Tanks Having Secondary Containment Means

A storage tank system especially useful for storing liquid gasoline in one aspect comprises a rigid inner tank encased by a flexible outer jacket with a leak detecting means associated with the closed space between the inner tank and jacket. In another aspect, an outer rigid tank contains a bladder within it together with leak detecting means between the tank and bladder. The system results in a storage facility which is less likely to lose its stored liquid to the environment due to a slow leak or a sudden large leak such as is possible with an earthquake.

U.S. Pat. No. 4,648,523 Underground Tank Assembly with Internal Bladder

An improved underground tank assembly is provided for storing motor fuels, such as gasoline or diesel fuel. The underground tank assembly has an expandable bladder-like primary tank positioned within the interior of a rigid secondary tank. Advantageously, the secondary tank meets most safety regulations and secondary containment laws by dependably providing for secondary containment of any leakage of motor fuel from the primary tank. The underground tank assembly has numerous alternative conduit arrangements for ease and flexibility of assembly, installation, and manufacture. The underground tank assembly also desirably has a protective barrier wall for protecting and isolating the conduits from the expanded primary tank. Other safety equipment and controls, such as leakage detectors, are provided.

U.S. Pat. No. 4,696,186 Storage Tanks Having Secondary Containment Means

A storage tank system especially useful for storing liquid gasoline in one aspect comprises a rigid inner tank encased by a flexible outer jacket with a leak detecting means associated with the closed space between the inner tank and jacket. In another aspect, an outer rigid tank contains a bladder within it together with leak detecting means between the tank and bladder. The system results in a storage facility which is less likely to lose its stored liquid to the environment due to a slow leak or a sudden large leak such as is possible with an earthquake.

U.S. Pat. No. 4,763,805 Underground Tank Assembly with Internal Bladder

An improved underground tank assembly is provided for storing motor fuels, such as gasoline or diesel fuel. The underground tank assembly has an expandable bladder-like primary tank positioned within the interior of a rigid secondary tank. Advantageously, the secondary tank meets most safety regulations and secondary containment laws by dependably providing for secondary containment of any leakage of motor fuel from the primary tank. The underground tank assembly has numerous alternative conduit arrangements for ease and flexibility of assembly, installation, and manufacture. The underground tank assembly also desirably has a protective barrier wall for protecting and isolating the conduits from the expanded primary tank. Other safety equipment and controls, such as leakage detectors, are provided.

U.S. Pat. No. 4,796,676 Fluid Storage Tank System

A storage tank system for storing fluids in an environmentally safe container which includes a rigid external primary tank having a flexible protective secondary inner tank positioned within the tank and drawn, by negative pressure, into contact with the internal walls of the rigid external tank. A continuous monitoring system is connected into, and made a part of, the portion of the system used to evacuate the space between the inner and outer tanks, so that any leakage or loss of integrity which is developed in the liner can be immediately detected at any time.

U.S. Pat. No. 5,072,623 Double Bladder Fluid Containment System

A triple-walled fluid containment system which includes a rigid metallic outside tank, an outer flexible bladder positioned within the rigid outside tank and a plurality of suspension elements between the tank and the outer bladder for suspending the flexible outer bladder within, and adjacent, the tank. An inner flexible bladder of complementary configuration to the outer bladder is located within, and adjacent, the outer bladder. A vacuum monitoring system communicates with the interstice between the outside and the inside bladder for evacuating the space therebetween.

U.S. Pat. No. 5,158,201 Storage Tank Having Secondary Containment

An underground storage tank having secondary containment comprising a self-supporting, semi-rigid thin wall located on the inside of the tank. The thin inner wall completely lines the inside of the tank and is structurally independent of the tank.

U.S. Publication No. 20090007983 Vapor Containment and Electrical Power Generation A fuel vapor and energy conservation system includes one or more liquid fuel storage tanks connected to at least one fuel dispenser for delivering liquid fuel to vehicle fuel tanks and a motor/generator set powered by the evaporated fuel vapor and/or liquid fuel, used alone or in combination to generate electrical power. In some implementations, the fuel vapor and energy conservation system also includes a vapor conservation system with a tank defining a tank volume and a bladder disposed within the tank volume and defining a bladder volume for receiving fuel vapor from the ullage space, the tank and the bladder defining an air space external of the bladder, with a system of vapor conduit for conducting evaporated fuel vapor between the ullage space and the bladder volume and a system of air conduit for conducting air into and out of the air space external of the bladder.

U.S. Publication No. 20090308876 Aboveground Rectangular Secondary Containment Generator Base Tank with Internal Flexible Bladder The present invention is a containment tank or a generator set including an outer tank and an inner flexible tank that offers a storage area for diesel fuel for a diesel engine powered generator set. So that the generator set diesel engine have ready source of clean diesel fuel the inner flexible tank provides a corrosion-free storage area that will not corrode or contaminate the diesel fuel. The outer tank is designed to provide a structure that not only protects the inner tank from damage, but acts as a support structure for the diesel engine generator set and other components (enclosure, switchgear, etc.) that are needed for the generator sets protection from wind, rain or snow or to act as control devices for diesel engine generator set. Also, since the design of the inner tank is flexible, it can be replaced easily through a manway formed on the outer tank without having to disconnect or disassemble the generator set.

U.S. Publication No. 20130213974 Gasoline Storage Device

A gasoline storage device, which is regulated to prevent gasoline from vaporizing, and is fabricated from a soft gasoline bag made from soft material that has been processed and coated on both sides so as to be resistant against gasoline and the majority of chemical liquids. The soft gasoline bag can be folded into a small size, directly disposed into a steel gasoline tank and allowed to unfold. Expandable hoses are used to respectively connect to the existing gasoline inlet pipe, gasoline-measuring pipe and manhole of the steel gasoline tank. The soft properties of the soft gasoline bag are used to isolate the gasoline stored within the steel gasoline tank from the air, thereby reducing vaporization of gasoline, pollution and wastage.

Most of the fuel storage tanks described above are designed to contain leaks and prevent fuel from leeching into the ground, particularly with respect to tanks that are specifically designed to be placed underground. The present invention does include the advantage of additional protection against leaks and fuel leaching into the ground, but also provides additional benefits, including ease of replacement of the bladder within the outer tank with minimal impact on the operation of the generator. Other objects and advantages will become apparent via the description and discussion included herein.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Overview

Figure 1:
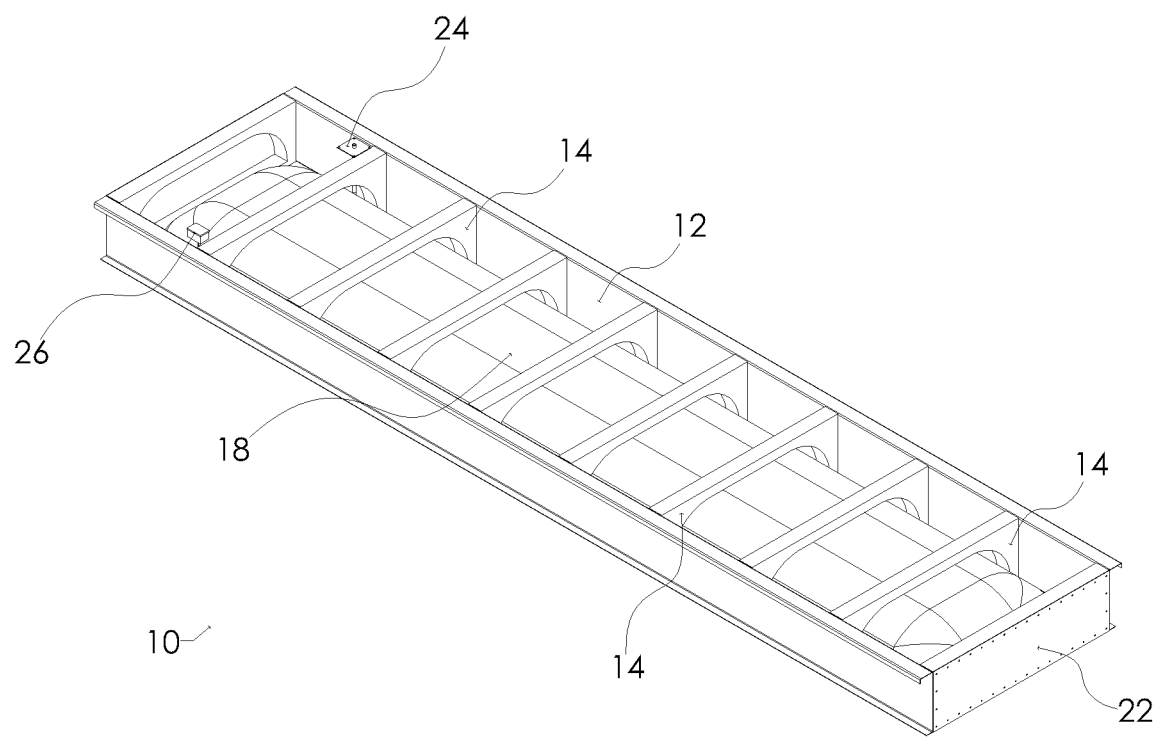
FIG. 1 is a perspective view of one embodiment of a fuel tank assembly having an internal bladder in accordance with the present invention, wherein a generally rectangular shaped rigid outer fuel tank includes a series of cross-support members that are shaped to form an arch, which provides a longitudinal channel through the center of the fuel tank for receiving an internal, removable bladder that is used to contain fuel.
Figure 2:
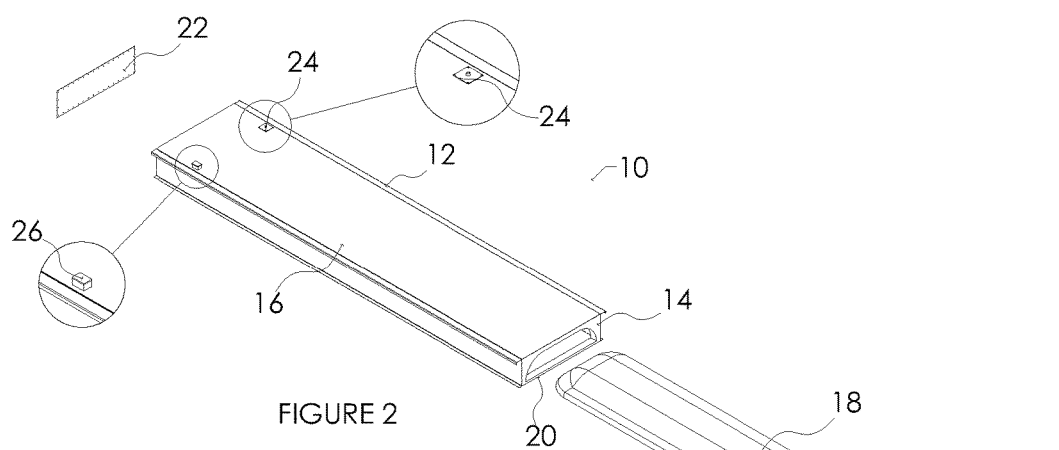
FIG. 2 is an exploded perspective view showing the fuel tank assembly of FIG. 1, and further showing removable end caps that are attachable to either end of the rigid outer tank, an internal bladder having a generally flat bottom portion and a top portion that is generally arched to that it may slide into either end of the outer fuel tank, and further showing inset drawings of a control box attached to the outer fuel tank and a fuel port for filling the internal bladder with fuel.
Figure 3:
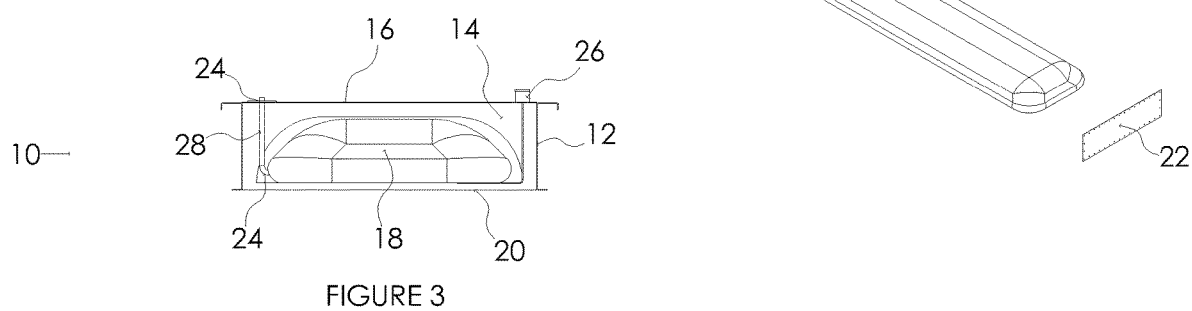
FIG. 3 is an end view of one embodiment of the fuel tank assembly, showing the outer fuel tank and an internal bladder positioned within the outer fuel tank, and wherein a fuel port positioned on the outer fuel tank is operatively connected to the internal bladder by a hose or tube.
Figure 4:
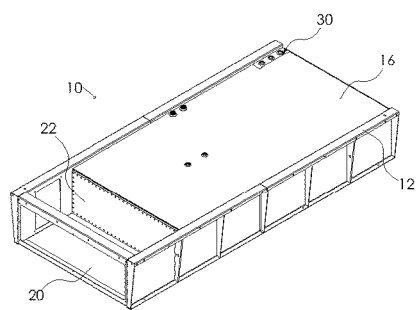
FIG. 4 is a top view of one embodiment of the fuel tank assembly, showing the outer fuel tank and an internal bladder positioned within the outer fuel tank.
Figure 5:
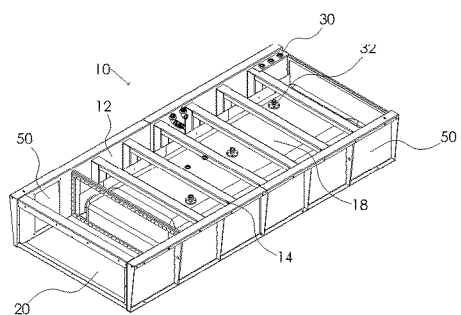
FIG. 5 is a perspective view of one embodiment of a fuel tank assembly having an internal bladder in accordance with the present invention, wherein a generally rectangular shaped rigid outer fuel tank includes a series of cross-support members that are rectangular in shape for receiving an internal, removable bladder that is used to contain fuel.
Figure 6:
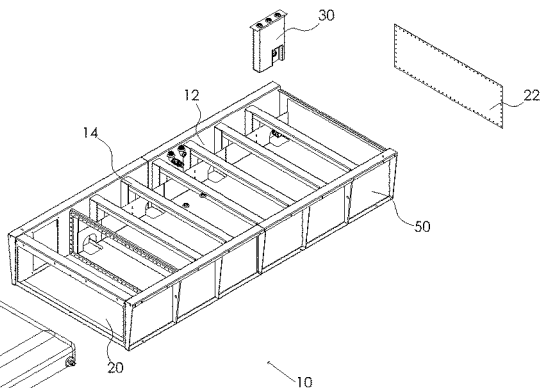
FIG. 6 is an exploded perspective view showing the fuel tank assembly of FIG. 5, and further showing removable end caps that are attachable to either end of the rigid outer tank, an internal bladder having a generally flat bottom portion and a top portion that is generally arched to that it may slide into either end of the outer fuel tank, and further including a small steel primary to be connected to the internal bladder.

The present invention is a fuel tank assembly 10 includes, in a first embodiment as shown in FIGS. 1-6, a rigid outer fuel tank 12 that is generally rectangular shaped, and includes a series of cross-support members 14 to provide structural support for placement of a generator on an upper surface or platform 16 of the outer fuel tank 12. The cross-support members 14 each include an arch shape on an underside thereof, as shown in FIGS. 1-3, or a rectangular shape, as shown in FIGS. 4-6, which provides a longitudinal channel through the center of the outer fuel tank 12 for receiving an internal, removable bladder 18 that is used to contain fuel.

The Fuel Tank Structure

The outer fuel tank 12 structure, as briefly described above, essentially includes an enclosed rectangular structure with a flat base member 20 and upper surface 16, along with sufficient support members 14 to support a generator or the like on the upper platform 16 of the fuel tank. The support members 14 are preferably arched, as shown in FIGS. 1-3, if the fuel tank assembly is supported by the top of the outer fuel tank 12 to provide a longitudinal channel for receiving the internal, removable bladder 18 within the outer fuel tank 12. Alternatively, the support members 14 are preferably rectangular, as shown in FIG. 4-6, if the fuel tank assembly is supported by the side rails of the outer fuel tank 12. Removable end caps 22 are attached to either end of the outer fuel tank 12, and the outer fuel tank 12 itself is sealed and watertight, in order to prevent any liquid fuel from leaking out of the outer fuel tank 12 structure.

The outer fuel tank 12 includes at least one, and preferably at least two fuel ports 24 for allowing fuel to be pumped into the internal bladder 18, as shown in FIG. 3. Liquid sensors (not shown) may be positioned within the outer fuel tank 12, preferably in low-lying areas around the internal bladder 18, in order to detect any liquid that is present within the outer fuel tank 12 structure, and the sensors are operatively connected (either hardwired or wirelessly, as desired) to an alarm or notification system, optionally through a control box 26. If the sensors detect liquid in the outer tank 12 structure, then the sensors trigger an alarm or notification to personnel who are charged with monitoring the generator operations so that the problem may be investigated and resolved. Similarly, other types of sensors may also be used to detect fumes or gases that may be present within the outer tank structure, and alarms or notifications may be triggered, accordingly. Other types of sensors or mechanisms may be included within the internal bladder 18, including fuel level sensors, temperature sensors, and the like.

Access hatches or panels 50 may also be provided in strategic positions around the outer fuel tank, so that an inspector or maintenance worker may gain access to the internal space of the outer fuel tank 12 for purposes of maintenance and inspection, and to check for leaks or other problems, particularly if an alarm or notification is received from any of the sensors.

Small Steel Primary

In a preferred embodiment, a small steel primary 30 sits within the outer fuel tank 12 and is attached to an attachment point on the internal bladder 18 via a cam and groove coupling (or other means). The small steel primary 30 is intended to be used for housing a mechanical level gauge in order to determine the fuel level in the internal bladder 18. When the small steel primary 30 is attached to the internal bladder 18, a portion of the fuel enters the small steel primary 30. The small steel primary 30 includes a gauge and a float. The float travels vertically along the fuel level within the small steel primary 30, causing a helix located between the float and gauge to spin, which in turn causes the needle on the gauge to turn and indicate the fuel level. The internal bladder 18 will inflate and deflate during operation, changing where the top of the internal bladder 18 is located. The attachment of the small steel primary 30 creates a fixed point so that the gauge remains stationary. The small steel primary 30 is also used to prevent overfilling the internal bladder 18 by allowing excess fuel to flow into the small steel primary 30.

Internal Bladder

As noted in the documents that are incorporated herein by reference, there are many types of internal bladders in use commercially, and they are made from a variety of different materials. It should be understood that the present internal bladder 18 may be used using any suitable flexible material, but is preferably made with a nylon fabric having a polyether based polyurethane coating. This material is commercially available today from the Seaman Corporation, and the product is identified commercially as 1940 PTFF.

The internal bladder 18, in a preferred embodiment, includes a flat bottom portion that is heat-sealed or otherwise adhered and joined to a generally arched top portion, so that it may slide into the arched channel within the outer fuel tank 12 structure, as shown in FIGS. 1-3. The internal bladder 18 may also slide into a rectangular channel within the outer fuel tank 12 structure, as shown in FIGS. 4-6. The internal bladder 18 is preferably made from a flexible material, so that it is collapsible, particularly when it contains little or no fuel therein. The bladder 18 includes fuel ports 24 that are operatively connected with the fuel ports 24 on the outer fuel tank 12 via a fuel line 28 or the like. The fuel line 28 may be connected to the internal bladder 18 and/or the outer fuel tank 12 via a quick connect assembly in a preferred embodiment, and such quick connect assemblies are well known and commercially available. In one preferred embodiment, each side of the internal bladder includes a lip extending longitudinally along the sides of the bladder 18. The lip may further include a series of grommets or attachment points 32, so that a cable may be attached to the grommets via clips (or other means) and attached to each side of the bladder 18. As discussed above, the outer fuel tank 12 includes removable end caps 22 on each end thereof, so that the bladder 12 may be pulled into the outer fuel tank 12 by pulling the cables through the outer fuel tank 12 by running the cables into one end of the outer fuel tank 12 and out of the other end. In this way, the internal bladder 18 may be pulled into one end of the outer fuel tank 12 by the cables until the internal bladder 18 is properly situated between the end caps, as shown in FIG. 1 or 5. Thereafter, the cables may be removed or detached from the grommets, or the cables may simply be left attached to the internal bladder 18 and stored within the outer fuel tank 12 structure.

If the internal bladder 18 becomes damaged, corroded, or springs a leak, then cables may be attached to both the damaged inner bladder 18 and a new replacement bladder 18. In this way, as the damaged inner bladder 18 is being removed from one end of the outer fuel tank structure 12, the new replacement bladder 18 is being dragged into the outer fuel tank structure. Once the replacement bladder 18 is properly situated, then the damaged inner bladder 18 may be disconnected from the cables and properly disposed of or recycled, and the end caps may be placed back into the closed position on the outer fuel tank structure with the new replacement bladder contained therein.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

What I claim is:

1. A fuel tank assembly comprising:
   an enclosed rigid outer fuel tank formed into a longitudinal structure including a series of support members, wherein said outer fuel tank includes a longitudinal channel for receiving an internal bladder and a pair of removable end caps that are disposed on opposed ends of thereof;
   a removable, collapsible internal bladder positioned within said longitudinal channel within said outer fuel tank;
   a small steel primary disposed within said outer fuel tank to detect the fuel level within said internal bladder, wherein said small steel primary further prevents said internal bladder from being overfilled with fuel; and
   wherein said internal bladder may be removed from or inserted into said outer fuel tank through either end thereof when one or both end caps have been removed.

2. The fuel tank assembly set forth in claim 1, further comprising a pair of pull cables, wherein said pull cables are attached to each longitudinal side of said internal bladder.

3. The fuel tank assembly set forth in claim 1, wherein said outer fuel tank and said internal bladder both include fuel ports that are in operative communication with one another so that a user may fill said internal bladder through said fuel ports.

4. The fuel tank assembly set forth in claim 3, wherein said fuel port on said outer fuel tank is connected to said fuel port on said internal bladder by a fuel line.

5. The fuel tank assembly set forth in claim 4, wherein said fuel line is connected to said outer fuel tank by a quick connect assembly.

6. The fuel tank assembly set forth in claim 4, wherein said fuel line is connected to said internal bladder by a quick connect assembly.

7. The fuel tank assembly set forth in claim 1, further including a liquid sensor disposed within said outer fuel tank to detect the presence of a liquid substance within said outer fuel tank.

8. The fuel tank assembly set forth in claim 1, wherein said internal bladder comprises a bottom portion and a top portion that are joined together to form an enclosed space for receiving fuel.

9. The fuel tank assembly set forth in claim 1, wherein said internal bladder is made from a nylon fabric having a polyether based polyurethane coating.

* * * * *